Jan. 29, 1946.  F. E. PILLING  2,393,806
WORK HOLDER
Filed Nov. 24, 1943  2 Sheets-Sheet 1
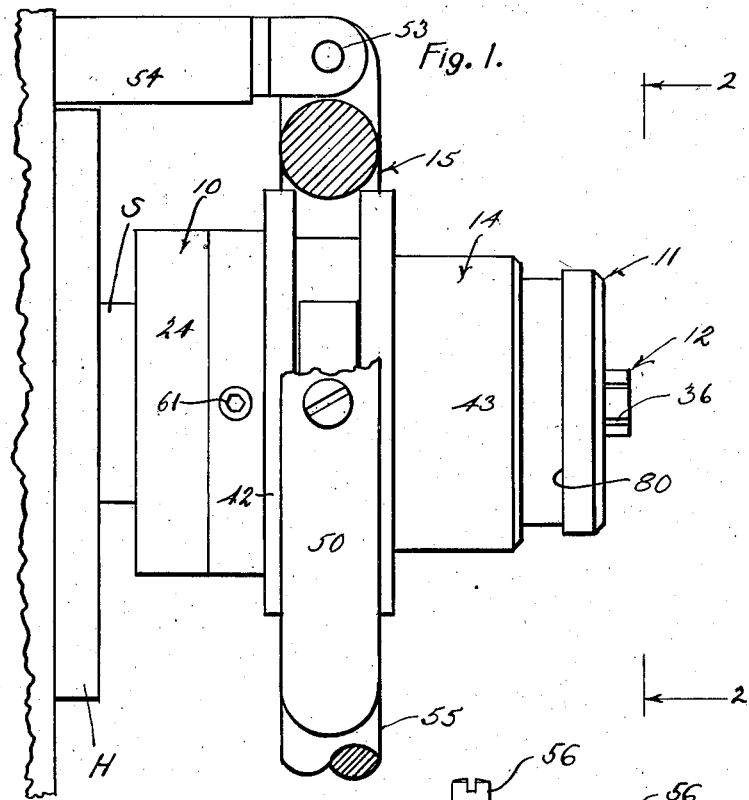
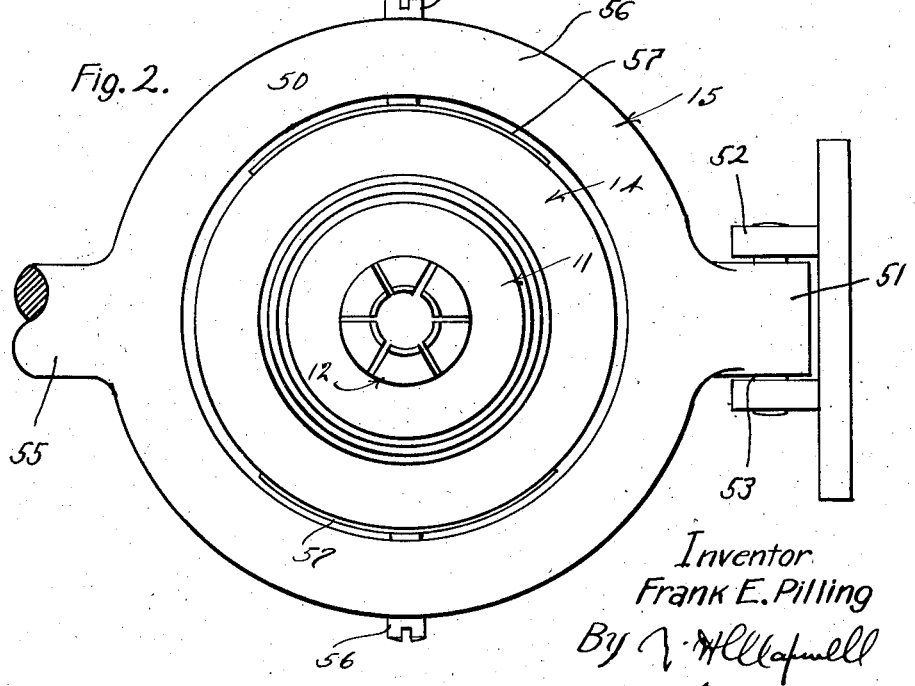
Inventor
Frank E. Pilling
By ~~~~
Attorney Jan. 29, 1946. F. E. PILLING 2,393,806
WORK HOLDER
Filed Nov. 24, 1943 2 Sheets-Sheet 2
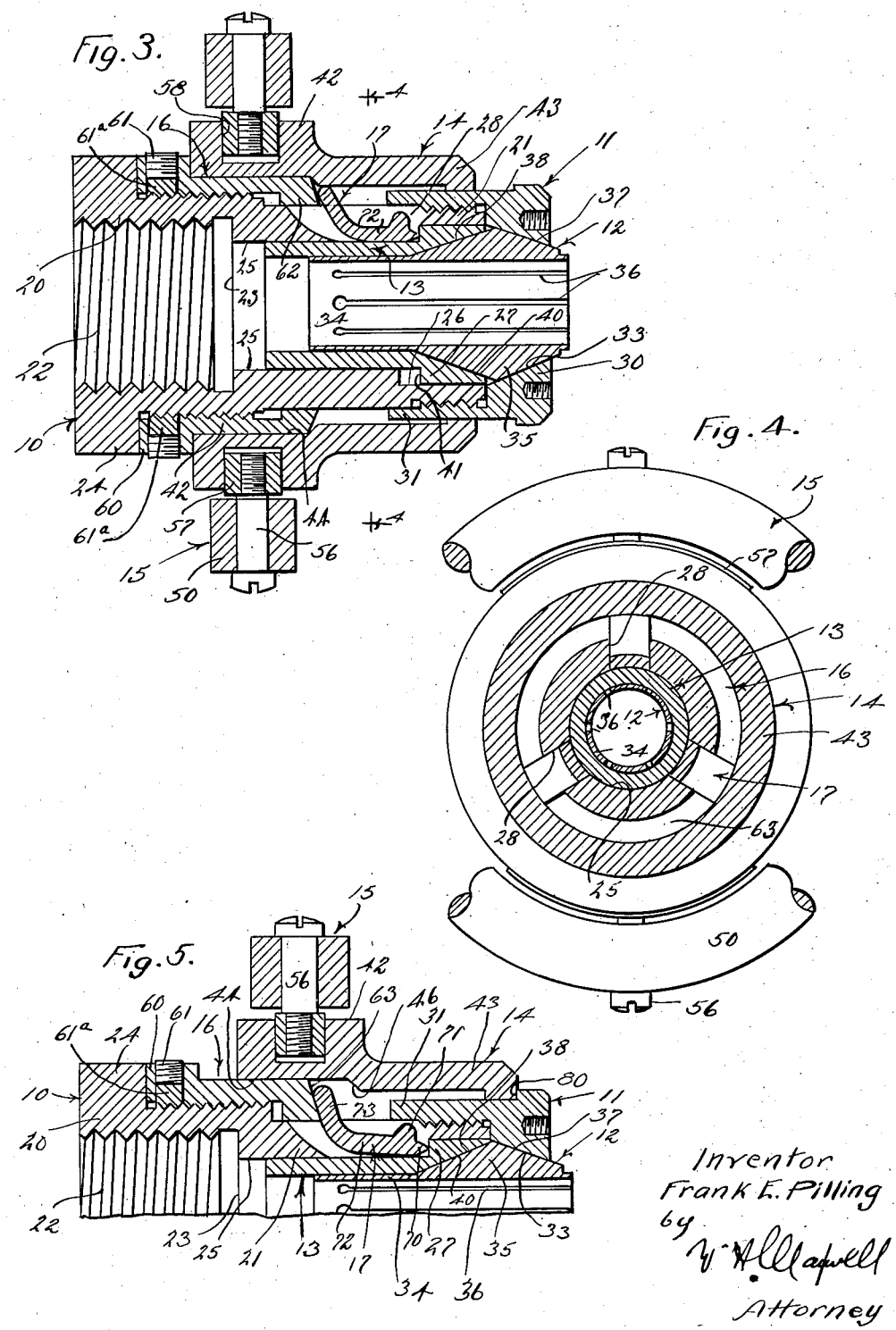
Inventor
Frank E. Pilling
by
Attorney Patented Jan. 29, 1946

2,393,806

UNITED STATES PATENT OFFICE 2,393,806

WORK HOLDER

Frank E. Pilling, Lynwood, Calif.

Application November 24, 1943, Serial No. 511,631

4 Claims. (Cl. 279—54)

This invention has to do with a work holder and has particular reference to a device applicable to the spindle of a lathe, or the like, for holding work, and it is a general object of the present invention to provide an improved simplified and highly efficient device of the character mentioned.

Various forms of work holding devices have been proposed and used in combination with the spindles of lathes or other like machines. A common form of such work holder involves a collet or gripping device operable to be tightened onto a member to be worked on. Most devices of the character mentioned have involved complicated or cumbersome mechanisms for operating the collets and when such mechanisms have been applied to hollow spindle lathes it has been common to operate them through a control member projecting out through the rear end of the lathe spindle. It will be immediately apparent that any control device or other part required to operate through the lathe spindle cuts down the effective size of the spindle or, in other words, limits the size of work that can be handled through the spindle.

It is a primary object of my invention to provide a collet type work holder applicable to a hollow operating spindle and operable by the operator of the machine without resort to control members, or the like, operating through the spindle. By my present invention I provide a collet type work holder operable by a simple lever applied to the head of the lathe or other like part, and I eliminate entirely the usual system of levers, rods, pivots, etc., incidental to a control system operating a work holder through a hollow spindle.

Another object of my invention is to provide a collet type work holder in which the collet is operated through a highly efficient, compact and dependable mechanism. By my invention I eliminate the usual pivoted levers provided for working a collet and I have provided an arrangement of parts which is compact and simple.

Another object of my invention is to provide a collet type work holder of the character mentioned which involves an extremely simple and effective means of adjustment whereby the gripping action of the collet can be quickly and accurately adjusted to accommodate the particular work being handled.

The various objects and features of my invention will be fully understood from the following detailed description of a typical preferred form and application of my invention, throughout which description reference is made to the accompanying drawings, in which:

Fig. 1 is a side elevation of the mechanism provided by my invention showing it applied to a typical lathe spindle projecting from the head of the lathe. Fig. 2 is a face or end view of the part shown in Fig. 1, being a view taken as indicated by line 2—2 on Fig. 1. Fig. 3 is a longitudinal detailed sectional view of the device provided by my invention showing parts in operated or gripping position. Fig. 4 is a transverse sectional view taken as indicated by line 4—4 on Fig. 3, and Fig. 5 is a fragmentary view showing a part of the mechanism illustrated in Fig. 3 with the parts arranged in the released position.

The work holder provided by my invention is applicable generally to spindles such as are found in lathes, and for sake of example I will refer to the invention as being applicable, generally, to work holders, whereas other features make the invention particularly suited for use on hollow spindles. For sake of example I will refer to the device as being applied to a hollow lathe spindle, it being understood, of course, that such reference is not to be construed as limiting the broader aspects of the invention. The device of the invention may be used to advantage on a solid spindle lathe.

The device of the present invention includes, generally, a body 10 applicable to the spindle S shown projecting from the head H of a lathe, a head 11 on the forward end of the body to carry the collet 12, a compression ring 13 slidable in the body 10 to engage and operate the collet 12, a working sleeve 14 surrounding the body, means 15 for operating or shifting the working sleeve 14, an abutment member 16 on the body providing an adjustable abutment shoulder, and a plurality of dogs 17 supported on the compression sleeve guided by the body and operated by the working sleeve to act between the compression member and the compression sleeve so that they operate the compression sleeve to actuate the collet.

The body 10 is the principal part or base element of the mechanism and is in the form of a tubular member having an inner end portion 20 applicable to the spindle of the lathe and an outer end portion 21 which serves to support or carry various other parts of the mechanism as will be hereinafter described.

The inner end portion 20 of the body is somewhat larger than the outer end portion and is provided with an internal screw thread 22 to receive the thread of the lathe spindle. The thread 22 is a coarse or heavy thread made to fit the thread of the spindle on which the device is to be used. In practice an internal shoulder 23 may be provided in the body at the inner end of the thread 22 to form an abutment to receive the end of the lathe spindle. In the case illustrated the extreme inner end of the body portion 20 is provided with a flange 24 which serves as a means by which the body can be conveniently engaged for the purpose of applying it to or removing it from the lathe spindle. The exterior of the inner body portion 20 beyond the flange 24 is threaded as shown in Figs. 3 and 5 to carry the abutment member 16, as will be hereinafter described.

The outer end portion 21 of the body 10 is in the form of a straight tubular part projecting forward from the inner end portion 20 and is concentric therewith. The opening or bore 25 of the body portion 21 is finished to slidably receive and carry the compression sleeve 13. The bore 25 has an enlarged portion 26 extending into it a short distance from its forward end to accommodate an enlargement 27 on the forward end of the compression sleeve.

A plurality of longitudinally disposed and circumferentially spaced guide-ways 28 are provided in the body portion 21 to receive and guide the dogs 17. In practice the number of dogs employed may vary, in which case the number of guideways 28 in the body will correspondingly vary. In most instances it is desirable to employ three dogs, in which case I employ three guideways 28 spaced 120° apart around the body. The guideways extend completely through the part 21, that is, radially from its inner to its outer surfaces and are made sufficiently long to properly accommodate the dogs 17, as will be hereinafter described. The guideways are provided primarily to accommodate and guide the dogs 17, their principal function being to confine the dogs and guide them so that they operate properly in combination with the other parts, as will be hereinafter described.

The outer or forward end portion of the body part 21 is externally threaded as shown in Figs. 3 and 5 to receive the head 11, which is applied to the forward end of the body.

The head 11 is applied to the forward end of the body and serves to carry or support the collet 12. The head is in the form of a sleeve screw-threaded onto the forward end of the body and is provided immediately beyond the forward end of the body with an inwardly projecting flange 30 and is also provided with a rearwardly projecting collar 31 which projects or extends over the body portion 21 beyond the forward threaded portion to serve as a retainer for the dogs 17.

The head 11 is applied firmly to the forward end of the body portion 21 so that it is, in effect, a rigid or continuous part of the body, the structure having been divided into the body and head as separate parts mainly to facilitate manufacture and assembly. The inwardly projecting flange 30 on the forward end of the head 21 has a bevelled or conically shaped socket 33 formed into it which receives and holds the collet 12.

The collet 12 is a tubular device including, generally, a tubular part 34 arranged within the compression sleeve 13 and an enlarged part 35 at its forward end fitting a tapered socket 33 of the head 11 and adapted to be engaged by and to cooperate with the compression sleeve 13. The collet is split or divided longitudinally by a plurality of cuts 36 which extend through the parts 35 and 34 from the forward end of the collet to a point close to the rear end of the tubular part. This divides the collet into a plurality of finger-like segments and gives the collet flexibility, enabling it to be compressed onto work arranged in it. The opening through the collet may correspond in size with the opening through the spindle or it may even be larger than the opening in the spindle.

The enlargement 35 of the collet has a forward tapered surface 37 adapted to fit in the tapered socket 33 and a rearward tapered surface 38 adapted to cooperate with the compression sleeve 13. It is to be noted from the drawings that the tapered surfaces 37 and 38 of the enlargement 35 of the collet 12 are pitched in opposite directions, that is, the surface 37 pitches forward and inward whereas the surface 38 pitches rearward and inward, the pitches or inclinations of the surface being in opposite directions.

The compression sleeve 13 is slidably carried in the bore 25 of the body 10 so that it closes or fits over the guideways 28 in the body and forms a support on which the dogs 17 rest. The forward end portion of the compression sleeve 13 is enlarged at 27 to form a tapered socket 40 provided in the forward end of the compression sleeve to accommodate the enlargement 35 of the collet and to form a rearwardly facing shoulder 41 against which the forward ends of the dogs 17 bear.

The working sleeve 14 surrounds the body 10 and, in effect, forms a housing for the various working parts. The inner end portion 42 of the working sleeve 14 is slidably supported on the exterior of the abutment member 16 while the forward end portion 43 of the working sleeve 14 is slidably supported on the exterior of the head 11. This provides bearing support for the working sleeve at both ends thereof and effectively seals the mechanism against foreign matter that would otherwise find its way into the parts where the dogs operate.

The bore 44 at the inner end portion 42 of the sleeve 14 which slidably receives the abutment member 16 is somewhat larger in diameter than the forward portion 43 of the sleeve 14 which projects over the dogs so that there is a shoulder 46 formed between the sleeve portions 42 and 43. This shoulder 46 is inclined or pitched so that it extends outwardly and rearwardly and is the part of the working sleeve 14 which cooperates with the dogs to operate them when the sleeve is operated. The sleeve 14 being mounted as hereinabove described is shiftable longitudinally of the other parts between a position such as is shown in Fig. 5 and a position such as is shown in Fig. 3, and the sleeve may turn relative to the other parts although ordinarily the pressures on it are such that it revolves with the other part.

The means 15 for operating the working sleeve 14 may vary, depending upon the particular installation or situation in which the device is used. In the simple form of the invention illustrated in the drawings a yoke 50 surrounds the inner end portion of the working sleeve. The yoke has an ear 51 connected to a mounting fixture 52 by a pivot pin 53. The fixture 52 is adapted to be applied to a bracket 54 or to any stationary part of the lathe head H. At a point diametrically opposite the ear 51 the yoke has a projecting handle 55 which, in practice, is shaped and proportioned to be conveniently engaged and operated by the operator of the machine. It will be understood from an examination of Figs. 1 and 2 of the drawings how the yoke can be shifted by means of the handle 55 to move it relative to the device which operates through it.

The yoke 50 carries trunnions 56 which project inwardly from the yoke to engage and carry shoes 57 which slidably operate in a guideway or annular groove 58 formed in the exterior of the inner portion 42 of sleeve 14. By this construction the yoke 50 is operatively connected with the operating sleeve 14 so that when the yoke is operated or swung the sleeve 14 is moved longitudinally relative to the other parts of the device.

The abutment member 16 is carried on the body and is, in effect, a part of the body. This member is in the form of a ring screw-threaded on the portion 20 of the body 10. The exterior of the member 16 is finished to slidably carry the inner end portion 42 of the sleeve 14 and the extreme inner end of the member 16 is provided with a radially projecting flange 60 which carries set screws 61 whereby the member 16 can be effectively set in any desired position or adjustment relative to the body. The forward end portion of the member 16 is provided with an inwardly projecting flange 62 which slidably passes the forward portion 21 of the body 10 and which has its forward face 63 pitched and finished to form an abutment face against which the rear ends of the dogs operate. The abutment face 63 is pitched inwardly and forward so that the rear ends of the dogs upon being moved inwardly against the face 63 are forced forward in the guideways 28.

The dogs 17, where several are employed, are alike in construction and operation. Each dog has a forward or nose portion 70 adapted to bear forwardly against the shoulder 41 of the compression sleeve 13, has a radially outwardly projecting ear portion 71 which may engage the interior of the collar 31 of the head 11, has a rearwardly projecting body 72 and has a tail 73 which projects rearwardly and radially outward to bear against the abutment shoulder 63 and to cooperate with the operating shoulder 46 as will be described. It is to be noted that the construction is such that the dogs are simply guided in the guideways 28 so that they are free to float or move bodily in the course of operation between the positions shown in Figs. 3 and 5 and that they do not involve or require any pivotal mountings or complicated supporting construction difficult to incorporate in a mechanism of the character under consideration.

When the mechanism above described is in the released position the working sleeve 14 is in a forward position such as is shown in Fig. 5, the forward movement being limited by stop shoulder 80 on the forward end of the head 11. In this position the operating shoulder 46 in the working sleeve 14 is forward and allows the end portions of the tails of the dogs to move out along the abutment shoulders 63 which in turn allows the noses 70 of the dogs to retract or move rearwardly relieving the compression sleeve so it in turn can move rearwardly and relieve the collet so it is free to expand to an open position.

Work to be gripped is arranged in the collet while the collet is relieved or open, as just described, and while the parts are in the position shown in Fig. 5. To set or grip the work the operator moves the handle 55 so that the yoke 50 is operated, causing the working sleeve 14 to be moved rearwardly from the position shown in Fig. 5 to that shown in Fig. 3. In the course of this operation the operating shoulder 46 engages the outer portions of the tails 73 forcing them inwardly along the abutment shoulders 63. Since the abutment shoulders 63 are pitched forward and inward as clearly shown in the drawings, the dogs are bodily thrust forward as their tail portions are forced inward. As the dogs move forward the nose portions 70 engage the shoulder 41 of the compression sleeve causing the compression sleeve to be forced forward so that the socket 40 of the compression sleeve crowds the enlargement 35 of the collet forward into the socket 33 in the head 11 with the result that the collet is compressed onto the work.

It is to be noted that during the closing operation the ears 71 of the dogs are located within the collar portion 31 of the head so that the dogs are confined to properly cooperate with the compression sleeve. It is also to be noted that when the working sleeve 14 reaches its final position, as shown in Fig. 3, the outer ends of the tails 73 have passed off of the shoulder 46 and into the forward portion 43 of the working sleeve which serves to positively retain the dogs in the fully operated position.

It will be apparent that the amount or degree to which the sleeve 13 is thrust forward through the action above described and consequently the amount to which the collet is compressed, will depend, in practice, upon the spacing of the abutment shoulder 63 and the shoulder 41 of the compression sleeve 13. By my invention I provide for adjustment of this spacing by threading the abutment member 16 on the body 10. When the parts are properly set or adjusted so that the collet has the desired gripping action the abutment member 16 is set in position by tightening the set screws 61 which tighten the blocks 61ª under them against the body 10.

Having described only a typical preferred form and application of my invention, I do not wish to be limited or restricted to the specific details herein set forth, but wish to reserve to myself any variations or modifications that may appear to those skilled in the art, or fall within the scope of the following claims.

Having described my invention, I claim:

1. A work holding device for use on a hollow spindle including, a tubular body to be applied to the spindle and having a lateral opening to carry a dog and a tapered end opening, a tubular collet carried by the body and having a tapered part bearing in said end opening, and means for operating the collet including a compression sleeve slidably carried in the body to operate the collet and completely closing the inner end of the lateral opening, a working sleeve surrounding the body and operable relative thereto, and a dog carried in the opening and operated by the working sleeve to actuate the compression sleeve, the compression sleeve having a tapered part engaging the collet to force it into the tapered opening of the body.

2. A work holding device for use on a hollow spindle including, a tubular body to be applied to the spindle and having a lateral opening to carry a dog and a tapered end opening, a tubular collet carried by the body and having an outer tapered part bearing in said end opening, and means for operating the collet including, an abutment member carried by the body, a working sleeve surrounding the body and operable relative thereto and covering the outer end of the opening, a compression sleeve engaging the collet to operate it and completely closing the inner end of the lateral opening, and a free dog in the opening operated by the working sleeve to act between the abutment member and compression sleeve so the compression sleeve operates the collet, the collet having an inner tapered part pitched opposite to the outer tapered part and the compression sleeve having a tapered forward end cooperatively engaging the inner tapered part of the collet.

3. A work holding device for use on a hollow spindle including, a tubular body to be applied to the spindle, a head mounted on the forward end of the body and having a tapered socket, a tubular collet carried by the body and having a single projection with an outer tapered part engaged in the socket, the collet projection having an inner tapered part pitched opposite to the outer tapered part and means for operating the collet including a working sleeve surrounding the body and head to bear thereon and operable relative thereto, a compression sleeve slidably supported in the body and having a tapered socket in its outer end receiving the inner tapered part of the collet, and a dog operated by the sleeve to actuate the collet.

4. A work holding device for use on a hollow spindle including, a tubular body to be applied to the spindle and having a lateral opening and a tapered opening in its forward end, a tubular collet carried by the body and having a collapsible portion with an external projection with oppositely pitched inner and outer end portions, said outer portion being seated in the tapered opening of the body, and means for operating the collet including, an abutment member carried by the body, a working sleeve surrounding the body and operable relative thereto and covering the opening therein, a compression sleeve in the body engaging the collet to operate it and covering the opening in the body and having a tapered socket in its forward end receiving the inner end portion of the collet projection, and a loose dog confined in the opening and operated by the working sleeve to act between the abutment member and compression sleeve so the compression sleeve operates the collet, the dog having a forwardly projecting nose portion engaging the compression sleeve and a rearward and radially outwardly projecting tail portion cooperating with the abutment member and working sleeve.

FRANK E. PILLING.